United States Patent
Hoang et al.

(10) Patent No.: US 12,436,924 B2
(45) Date of Patent: Oct. 7, 2025

(54) UNSUPERVISED LEARNING FROM PUBLIC TABULAR DATASETS

(71) Applicant: International Business Machines Corporation, Armonk, NY (US)

(72) Inventors: Thanh Lam Hoang, Maynooth (IE); Gabriele Picco, Dublin (IE); Lam Minh Nguyen, Ossining, NY (US); Dzung Tien Phan, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/066,327

(22) Filed: Dec. 15, 2022

(65) Prior Publication Data
US 2024/0202167 A1  Jun. 20, 2024

(51) Int. Cl.
*G06F 16/21* (2019.01)
*G06F 16/22* (2019.01)
*G06N 20/00* (2019.01)

(52) U.S. Cl.
CPC ........ *G06F 16/211* (2019.01); *G06F 16/2282* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 11,790,558 B1 * | 10/2023 | Balakrishnan | G06T 11/00 |
| | | | 382/154 |
| 2020/0372369 A1 | 11/2020 | Gong | |
| 2021/0034977 A1 | 2/2021 | Arik | |
| 2022/0086175 A1 * | 3/2022 | Bharrat | G06N 3/088 |
| 2023/0107337 A1 * | 4/2023 | Toroman | G06F 18/214 |
| | | | 702/182 |
| 2024/0095592 A1 * | 3/2024 | Hiromoto | G06N 20/00 |

FOREIGN PATENT DOCUMENTS

| | | | |
|---|---|---|---|
| IT | 202100008552 A1 * | 10/2022 | |
| KR | 2021-0066754 A * | 6/2021 | |
| WO | 2021177879 A1 | 9/2021 | |

OTHER PUBLICATIONS

Handling Incomplete Heterogeneous Data using VAEs, Nazabal et al (Year: 2020).*
Bashath et al., "A Data-Centric Review of Deep Transfer Learning with Applications to Text Data", Information Sciences 585 (2022), Elsevier, Available online Nov. 27, 2021, 31 pages.
(Continued)

*Primary Examiner* — Augustine K. Obisesan
(74) *Attorney, Agent, or Firm* — Jordan Schiller; Andrew D. Wright; Calderon Safran & Wright P.C.

(57) ABSTRACT

A method, computer program product and system are provided for feature engineering and synthetic data generation. A processor retrieves a plurality of data tables, where the plurality of data tables are heterogeneous in format and content. A processor trains a variational auto-encoder (VAE) model on the plurality of data tables. A processor receives an input data table. A processor generates a synthetic data table based on the input data table and the trained VAE model.

20 Claims, 5 Drawing Sheets

(56) References Cited

OTHER PUBLICATIONS

Deng et al., "TURL: Table Understanding through Representation Learning", arXiv:2006.14806v2 [cs.IR] Dec. 3, 2020, 14 pages.
Huang et al., "TabTransformer: Tabular Data Modeling Using Contextual Embeddings", arXiv:2012.006678v1 [cs.LG] Dec. 11, 2020, 17 pages.
Iida et al., "TABBIE: Pretrained Representations of Tabular Data", arXiv:2105.02584v1 [cs.CL] May 6, 2021, 11 pages.
Joffe, Leonid, "Transfer Learning for Tabular data", TechRxiv Powered by IEEE, Posted Date Nov. 13, 2021, 14 pages.
O et al., "TabNet: Attentive Interpretable Tabular Learning", AAAI 2021, 9 pages.
Padhi et al., "Tabular Transformers for Modeling Multivariate Time Series", arXiv:2011.01843v2 [cs.LG] Feb. 11, 2021, 5 pages.
Xu et al., "Modeling Tabular Data using Conditional GAN", 33rd Conference on Neural Information Processing Systems (NeurIPS 2019), Vancouver, Canada, 11 pages.
Xu et al., "Synthesizing Tabular Data using Generative Adversarial Networks", arXiv:1811.11264v1 [cs.LG] Nov. 27, 2018, 12 pages.
Christopher M. Bishop. "Pattern Recognition and Machine Learning", Book, Springer, 2006, pp. 1-758.

\* cited by examiner

UNSUPERVISED LEARNING FROM PUBLIC TABULAR DATASETS

BACKGROUND OF THE INVENTION

The present invention relates generally to the field of machine learning, and more particularly to generating synthetic data and learning representation via unsupervised means for downstream machine learning tasks, such as regression and classification.

Machine learning models typically require large datasets to be digested in order to be properly trained within a domain. Publicly available data may be used, but public data is typically provided in different formats and arrangements thereby making training difficult. To help in the training process, synthetic data is produced to train the machine learning model. Synthetic data is data that is computer generated or otherwise "simulates" what an expected data table would look like. Synthetic data allows machine learning models to be trained on larger amounts of data, increasing the efficiency of downstream tasks such as regression or classification by the machine learning models.

SUMMARY

Embodiments of the present invention provide a method, system, and program product to provide for feature engineering and synthetic data generation. A processor retrieves a plurality of data tables, where the plurality of data tables are heterogeneous in format and content. A processor trains a variational auto-encoder (VAE) model on the plurality of data tables. A processor receives an input data table. A processor generates a synthetic data table based on the input data table and the trained VAE model.

DETAILED DESCRIPTION

Figure 1:
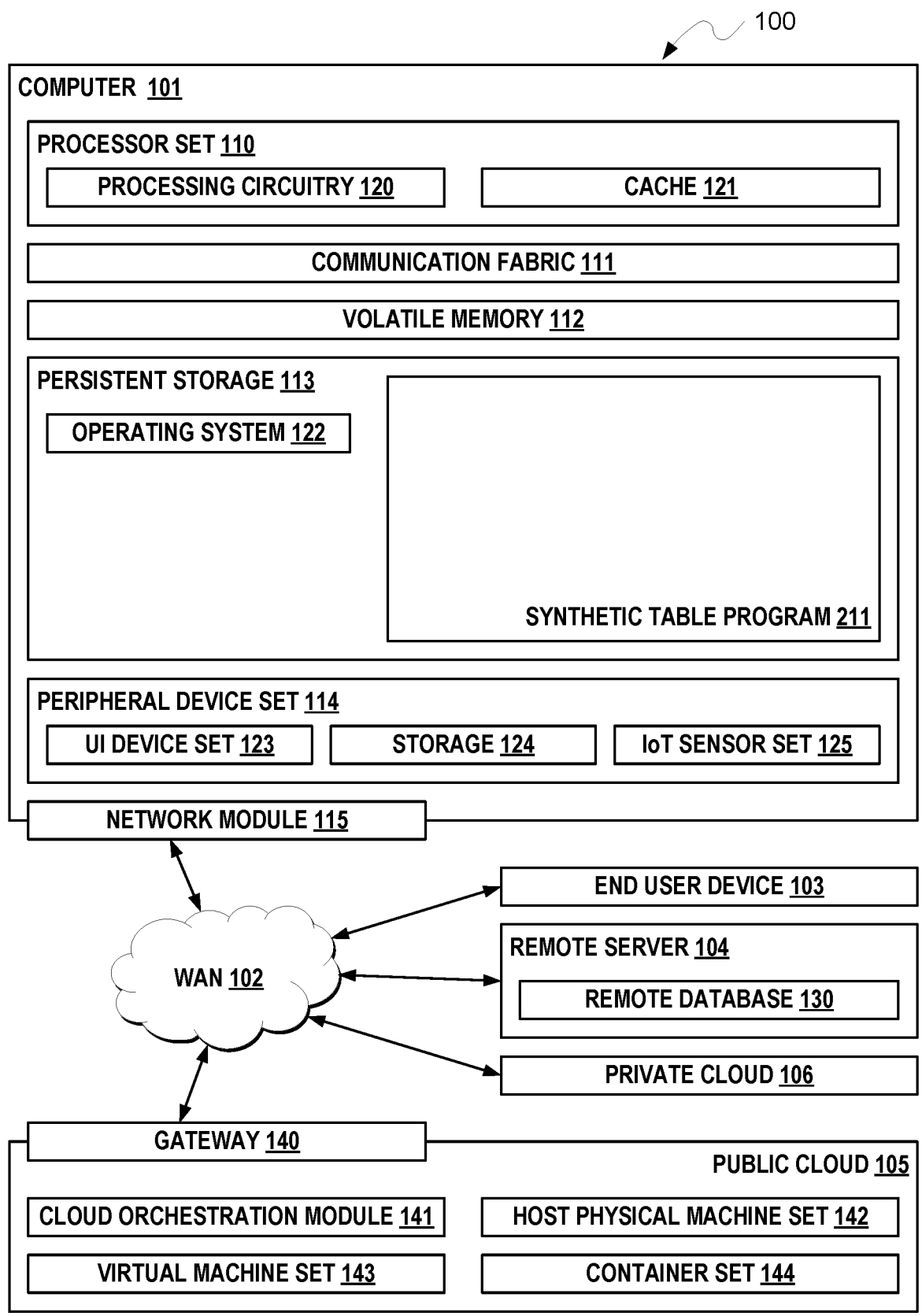
FIG. 1 depicts a block diagram of components of the computing device executing a synthetic table program, in accordance with an exemplary embodiment of the present invention

Embodiments of the present invention make use of publicly available data to learn features from a data set. While publicly available data is vastly abundant and great for forming data sets for machine learning, formatting and consistency among the data is nearly non-existent. As such, embodiments of the present invention provide mechanisms to convert said data for use in training a generative model. Once trained, the generative model can be used to help in the training process of downstream regression/classification tasks by providing representation of data using the pre-trained models, or in downstream tasks where synthetic data is produced to train the machine learning model or for other purpose Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as synthetic table program 211, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods (i.e., synthetic table program 211) may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
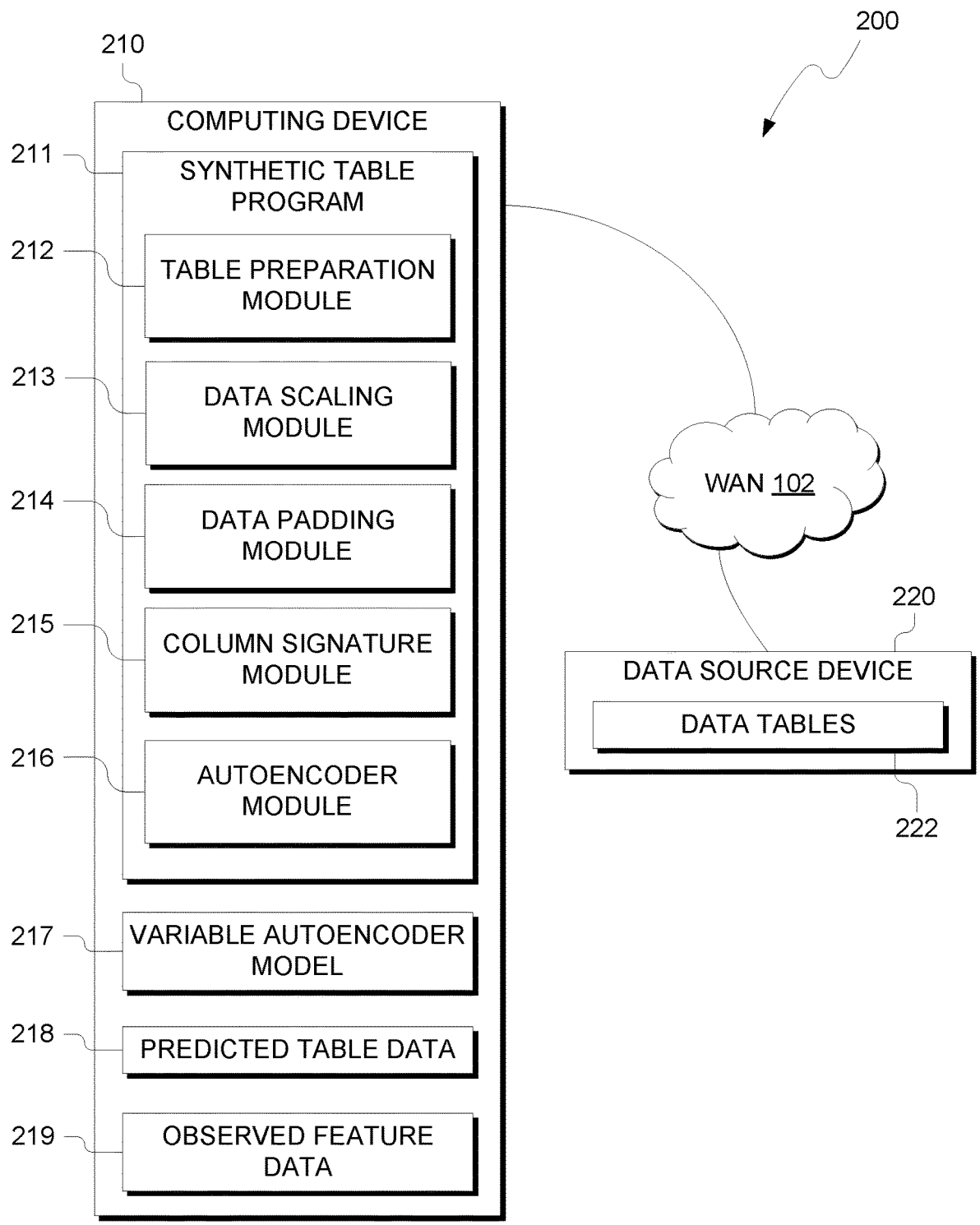
FIG. 2 is a functional block diagram illustrating a networked environment, in accordance with an exemplary embodiment of the present invention.

FIG. 2 is a functional block diagram illustrating networked environment, generally designated 200, in accordance with one embodiment of the present invention. Networked environment 200 includes computing device 210 data source device 220 connected over WAN 102. Computing device 210 includes synthetic table program 211, table preparation module 212, data scaling module 213, data padding module 214, column signature module 215, autoencoder module 216, variable autoencoder module 217, predicted table data 218, and observed feature data 219. Data source device 220 include data tables 222.

In various embodiments of the present invention, computing device 210 and data source device 220 are each computing devices that can be a standalone device, a server, a laptop computer, a tablet computer, a netbook computer, a personal computer (PC), or a desktop computer. In another embodiment, computing device 210 and data source device 220 each represent a computing system utilizing clustered computers and components to act as a single pool of seamless resources. In general, computing device 210 or data source device 220 can be any computing device or a combination of devices with access to synthetic table program 211, table preparation module 212, data scaling module 213, data padding module 214, column signature module 215, autoencoder module 216, variable autoencoder module 217, predicted table data 218, observed feature data 219, and data tables 222. Computing device 210 and data source device 220 may each include internal and external hardware components, as depicted and described in further detail with respect to FIG. 1.

In various embodiments, synthetic table program 211 trains variable autoencoder (VAE) model 217 based on available data tables 222 retrieved from data source device 220. As discussed herein, VAE model 217 is used by synthetic table program 211 to generate predicted table data 218, which predicts portions of, or generates entirely new, data tables based on the training underwent with data tables 222.

Data tables 222 are tabular forms of data that contain rows and columns, such as a database or spreadsheet. As discussed herein, when the term "columns" are discussed, the attribute, category, or type of data in the table is being referenced (i.e., a column with the heading "age" indicates that each value for that column represents the age of the entry). Similarly, when the term "rows" are discussed, the value or observation for a record is being referenced (i.e., the row will include observations or values for each category indicated by the columns). However, one of ordinary skill in the art will appreciate that data tables 222 may have different formatting without deviating from the invention. For example, the rows of a data table may indicate a category, while columns indicate observations or values. In some scenarios, data tables 222 are a variety of tables in a relational database which may be combined or rebuilt into a single tabular format by a database management program (not shown) of data source device 222.

Data source device 220, and the data tables 222 the source provides, is typically a publicly available device. As such, synthetic table program 211 retrieves data tables 222, via WAN 102, from data source device 220 when training VAE model 217. In some scenarios, access to data tables 222 may be restricted, such as requiring a log in or other credentials. In these scenarios, synthetic table program 211 is provided the credentials for retrieval or is otherwise given access to data tables 222. By crawling and finding available data tables 222, synthetic table program 211 is given access to a large amount of training data. However, as will be discussed below, publicly available data is typically not is a similar format, even if the data tables 222 are recording similar data. Names, values, and formatting can vary with each table; thereby utilizing public data for machine learning and training can pose certain challenges, which embodiments of the present invention provide solutions to solve such challenges.

While FIG. 2 depicts a single data source as data source device 220, a variety of data sources (not shown) may be used to retrieve respective data tables 222 for training. For simplicity of discussion, the following will discuss a single data source (i.e., data source device 220) that has multiple data tables 222 for retrieval. However, one of ordinary skill in the art will appreciate that embodiments of the present invention may apply to multiple data sources hosting a variety of data tables.

As previously discussed, data tables 222 are heterogenous or dissimilar in content such as values or formatting. One data table may list annual revenue for a company in the billions, while another may list the annual revenue in millions. This problem becomes even more pronounced when labels or names are recorded in the data table. For example, states or provinces may be abbreviated in one table, while another table spells out each name or uses different shorthand for the abbreviations (e.g., "PA", "Penn." for the state of Pennsylvania). As such, the raw data in data tables 222 cannot be easily used in training in machine learning without manual reformatting or with keys or legends from each type of shorthand, abbreviation, and the like for each type of data contained in data tables 222.

Embodiments of the present invention provide for various mechanisms and procedures to address the heterogenous nature of data tables 222. Initially, table preparation module 212 identifies columns in data tables 222 that are noisy or vary greatly for each row. For example, timestamps in a table may be removed since the variance in the timestamps may inhibit learning by VAE model 217 due to the numerous data points the timestamps provide. Next, data scaling module 213 normalizes the observations or data values in each row. Each table may use different scales or representations for the same item. For example, revenue in an income statement found in a company's annual report may report revenue in billions, while another company's income statement report revenue in millions. Data scaling module 213 converts the values of each column among the data tables 222 to represent a same unit of measurement (e.g., convert the first company's revenue to millions).

As discussed herein, data scaling module 213 utilizes a modified Gaussian Mixture Model (GMM) for normalizing observations across data tables 222 that contain numerical values. GMMs are a probabilistic model represents a known probability distribution and determines various gaussian (i.e., bell-curve) distributions that when combined recreate the original distribution. Much like reconstructing a signal based on component frequencies, when recombined the various gaussian distributions resemble the same distribution as initially observed. Each component gaussian distribution is referred to as a mode and is typically centered around local maxima in the known probability distribution.

In various embodiments, data scaling module 213 maps the data points for a column across to a probability distribution function, with the observed values being mapped to one dimension and the frequency of occurrence of the observed values mapped to another dimension of the probability distribution function. The GMM observes the modes of the distribution and then creates various component gaussian probability distribution functions with a mean and variance to fit each mode. Once the GMM is generated for the table or type of numerical value, data scaling module 213 subtracts the numerical values to all the multivariate means of the GMM's modes. Then data scaling module 213 divides this result by the standard deviation for the corresponding mode, or corresponding modes if overlap occurs among modes. Based on this result, data scaling module 213 generates a scaling vector to scale numerical values of a similar type.

In various embodiments, data scaling module 213 modifies the GMM process by constraining or restricting the size or the number of samples to be attributed to each mode. Unmodified GMM processes do not impose such constraints. As such, smaller modes or groupings sometimes get bundled with other modes, leaving out certain modes and therefore latent scaling features that may be imparted to VAE model 217. Therefore, embodiments of the present invention propose adding constraints the to GMM to limit the number of samples binned or grouped to each mode component. By constraining component size, embodiments of the present invention can identify and determine more accurate fluctuations or changes in data scaling than prior solutions.

In various embodiments, data padding module 214 ensures each table in data tables 222 has the same number of columns. Once the tables have been cleaned and noisy columns are removed, data padding module 215 determines the column width for each table. For tables that lack the width as the table with the most columns, data padding module 215 inserts blank columns with a data value to instruct VAE model 217 from considering the columns when training.

In various embodiments, column signature module 215 generates a signature for each column in data tables 222. As each table may have columns in different orders or locations, the signature permits synthetic table program 211 to track similar columns, such that VAE model 217 can identify patterns across similar columns in data tables 222. Initially, column signature module 214 evaluates column headers for category names. Then, column signature module 214 evaluates data types for the observations for the category, such as are the values represented as text or numbers, as well as the formatting (i.e., length of text, type of format for numbers, such as integer or floating formats). Additionally, column signature module 215 also evaluates any metadata associated with data tables 222. For example, type of table, data source, time of table creation and other aspects regarding the creation of data tables 222 may be scraped to includes a metadata for the table. Based on the extracted column data and metadata, column signature module 215 generates a signature for each column.

Based on the signatures for each column along with the data values for the rows for each column, autoencoder module 216 generates variable autoencoder (VAE) model 217. Autoencoders neural network models that are composed of multiple layers, with one or more input layers that contain exactly as much information as the output layer. Autoencoders take one situation or desired output as input into the model. The neural network then learns how to map the desired input to the output layer. The reason that the input layer and output layer have the exact same number of units is that an autoencoder aims to replicate the input data. It outputs a copy of the data after analyzing it and reconstructing it in an unsupervised fashion. The data that moves through an autoencoder isn't just mapped straight from input to output, meaning that the network doesn't just copy the input data. There are three components to an autoencoder: an input layer that compresses the data, a hidden layer that has fewer connections than the input and output layer, and an output layer that includes values for a desired result or previous outcome. When data is fed into an autoencoder, it is encoded and then compressed down to a smaller size. The network is then trained on the encoded/compressed data and outputs a recreation of that data.

During training, in various embodiments, synthetic table program 211 retrieves various public data tables 222. As discussed herein, column signature module 215 generates a signature for each column. Autoencoder module 216 provides the input layer of the VAE model 217 with the pre-processed table discussed herein (i.e., as processed by modules 212-214) in addition to the column signatures generated by module 215.

In various embodiments, once VAE model 217 is trained by autoencoder module 216, synthetic table program 211 can utilize VAE model 217 to generate synthetic table data as predicted table data 218 or to extract features from data tables as observed feature data 219. To generate predicted table data 218, synthetic table program 211 applies a processed data table to the input layer of VAE model 217. Since VAE model 217 has been trained to predict output layer values based on input, synthetic table program 211 generates predicted table data 218 based on any type of input data table retrieved from data tables 222. In various embodiments, synthetic table program 211 generates observed feature data 219. Observed feature data 219 includes various features present in input tables provided to VAE model 217 by synthetic table program 211. Typically, the features in observed feature data 219 are ranked based on a confidence of the VAE model 217 that the features are present.

In various embodiments, autoencoder module 216 provides unsupervised training of the VAE model 217. As discussed above, autoencoder neural networks determine a mapping between input and output layers, such that a given input can be "encoded" to represent a given output. Embodiments of the present invention provide unsupervised training by taking a variety of rows from data tables 222 and supply each row as a output during training. In this configuration, VAE model 217 will learn to encode the input data tables to each output row, inherently learning features of data tables 222.

Figure 3:
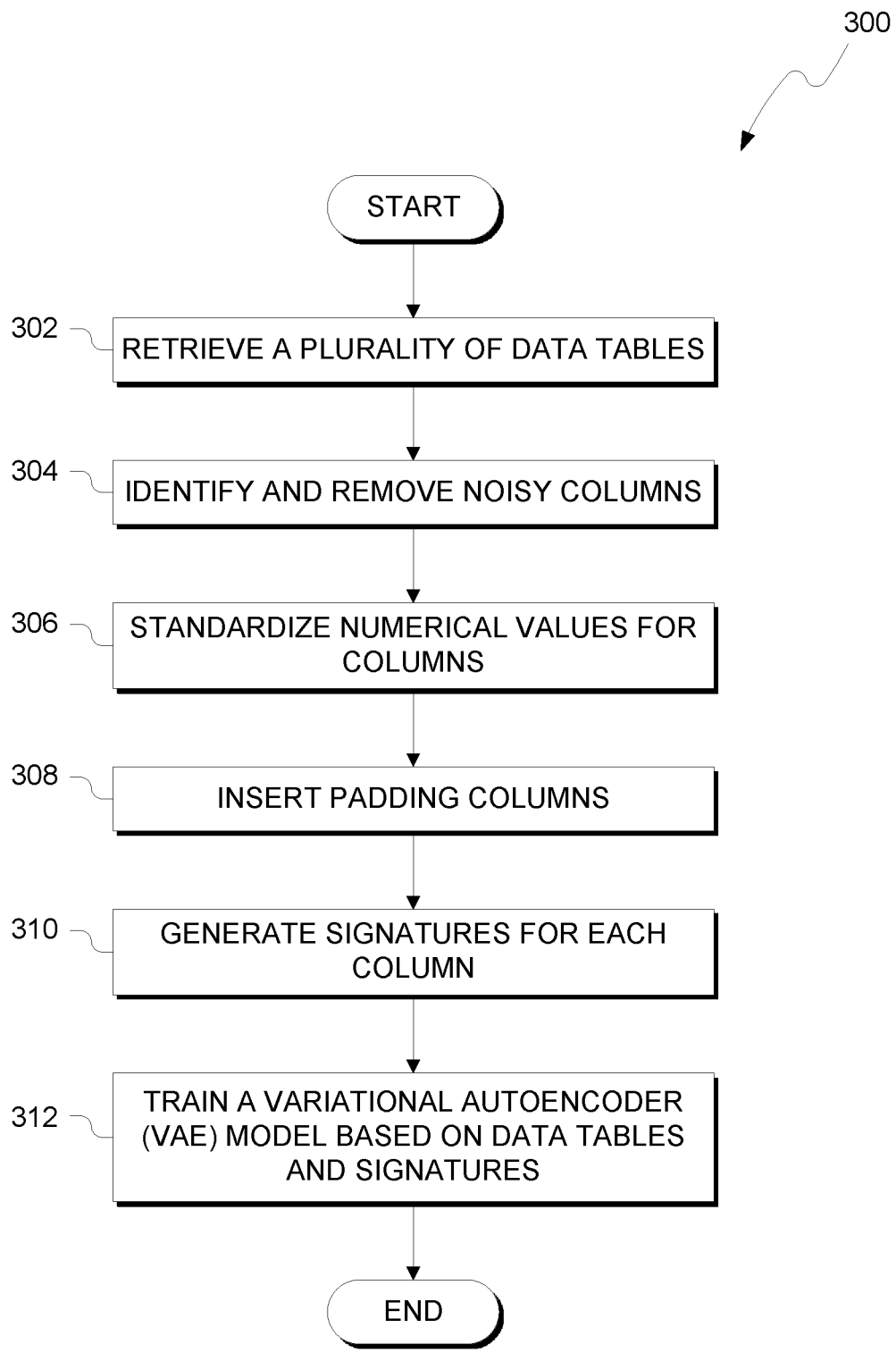
FIG. 3 illustrates operational processes of a synthetic table program training a variational autoencoder (VAE) model, on a computing device within the environment of FIG. 1, in accordance with an exemplary embodiment of the present invention.

FIG. 3 illustrates operational processes, generally designated 300, of synthetic table program 211 training variational autoencoder (VAE) model 217, on a computing device within the environment of FIG. 1, in accordance with an exemplary embodiment of the present invention. In process 302, synthetic table program 211 retrieves a variety of data tables 222 from one or more data source device(s) 220. As discussed herein, data tables 222 are not similar in contents nor formatting. One data table may have different columns than another. One table may use different values or denominations/units. While some tables may share similarities, it is understood that data tables 222 vary somewhat from one another and are non-homogeneous or heterogeneous.

In process 304, synthetic table program 211 identifies columns that have large variances between readings (i.e., rows). Such "noisy" or relatively high variance columns may prove to difficulty to train VAE model 217. In various embodiments, synthetic table program 211 determines a variance for the column's values across all rows, or in some instances, a subset or selection of rows. If the variance among the selected values is above a threshold, then synthetic table program 211 removes the column prior to training the VAE model 217. If the selected column's variance is below a threshold value, then synthetic table program 211 keeps the column for training.

In process 306, synthetic table program 211 standardizes the values for numerical values in retrieved data tables 222. Some columns may contain categorical or text based values (e.g., yes/no, addresses, names, etc.). For numerical values, disparate retrieved data tables 222 may use different units or scales. As such, synthetic table program 211 normalizes or standardizes the readings for columns with numerical values. Based on a Gaussian Mixture Model (GMM), synthetic table program 211 determines a variety of scaling factors based on component modes identified in a probability distribution function for the numerical values. In various embodiments, synthetic table program 211 constrains the number of samples per mode for increased accuracy across the number scale being used.

In process 308, synthetic table program 211 inserts padding columns to the retrieved data tables 222. In order for VAE model 217 to be trained properly, the retrieved data tables 222 need to have the same width (i.e., the same number of columns). If one data table is missing a column when compared to the other tables, then synthetic table program 211 inserts a blank or "zeroed" out column to compensate for the missing column. For example, synthetic table program 211 identifies the largest width of the retrieved data tables 222 and inserts the missing number of columns to the remaining number of tables that were retrieved for training.

In process 310, synthetic table program 211 generates a signature for each column. Synthetic table program 211 generates a signature for each column of the retrieved data tables 222 based on one or more of the following data collected from data tables 222: column name or descriptor, data type (e.g., integer/float, precision, and scale or units), labels used for categorical values (e.g., filing status "Married", "Single", etc.), and any other metadata regarding the table such as the table's author or the table's title. Based on the collected data from data tables 222, synthetic table program 211 generates a vector of quantiles for each column as well as word embeddings.

The word embeddings are generated via a Bidirectional Encoder Representations from Transformers, or BERT model, deployed by synthetic table program 211. A BERT model takes a string of text, such as a concatenated string of column labels, to determine common topics or aspects from in the string of text. A BERT transformer model digests text from a document (i.e., column headers in data tables 222) and generates word embeddings or phrase embeddings representing the topics or concepts discussed in the text. Based on the generated embeddings from the BERT model, synthetic table program 211 extracts topics from the extracted columns and metadata from data tables 222. These extracted topics are referred to as word embeddings. Synthetic table program 211 generates column signatures based on the extracted word embeddings for each data table.

In process 312, synthetic table program 211 trains VAE model 217 based on the data tables and column signatures, which comprises the word embeddings and metadata vector of quantiles discussed herein. In various embodiments, synthetic table program 211 trains VAE model 217 by extracting various rows from data tables 222. For a given input table, synthetic table program 211 connects a row from data tables 222 to the output layer of VAE model 217, while also connecting various tables from data tables 222 to the input layer. Synthetic table program 211 reiterates this process replacing the output layer with other rows and/or the input layer with other tables from data tables 222. After training ends, VAE model 217 is trained to predict an output row given an input table.

In various embodiments, synthetic table program 211 can create new predicted table data 218 based on input table data 222 and the trained VAE model 217. Synthetic table program 211 generates the predicted table data 218, row-by-row, by producing observed feature data 219, which is a predicted row generated by a single evaluation of VAE model 217, where predicted table data 218 is generated by repeatedly generating observed feature data 219 for the number of rows to be desired in predicted table data 218.

Figure 4:
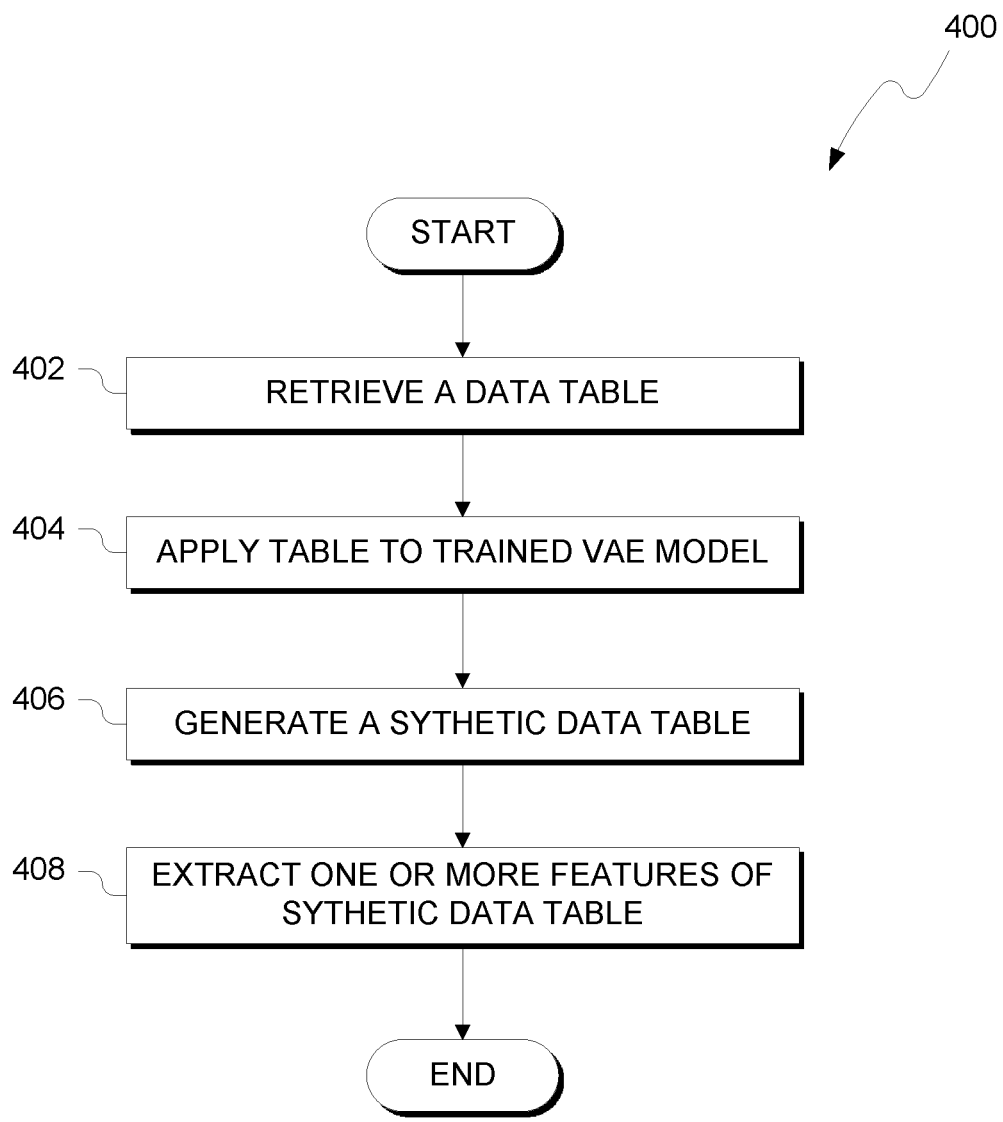
FIG. 4 illustrates operational processes of a synthetic table program generating synthetic tables and extracting features for downstream machine learning tasks, on a computing device within the environment of FIG. 1, in accordance with an exemplary embodiment of the present invention.

FIG. 4 illustrates operational processes, generally designated 400, of a synthetic table program generating synthetic tables and extracting features for downstream machine learning tasks, on a computing device within the environment of FIG. 1, in accordance with an exemplary embodiment of the present invention. In various embodiments, once VAE model 217 is trained, synthetic table program 211 is capable of generating synthetic data tables as predicted table data 218 as well as observed feature data 219 for regression machine learning tasks. In process 402, synthetic table program 211 retrieves a data table to create synthetic versions of tables of the same type. For example, if a revenue projection data table is provided in process 402, synthetic table program 211 will generate predicted table data 218 that has similar content. In process 404, synthetic table program 211 applies the retrieved table in process 402 to VAE model 217. As the same with training discussed herein, synthetic table program 211 generates column signatures for the retrieved table. Based on the word embeddings and vector of quantiles for the columns and metadata for the table, synthetic table program 211 generates a synthetic data table as predicted table data 218 (process 406) and extracts one or more features from the synthetic data table as observed feature data 219 (process 408).

Figure 5:
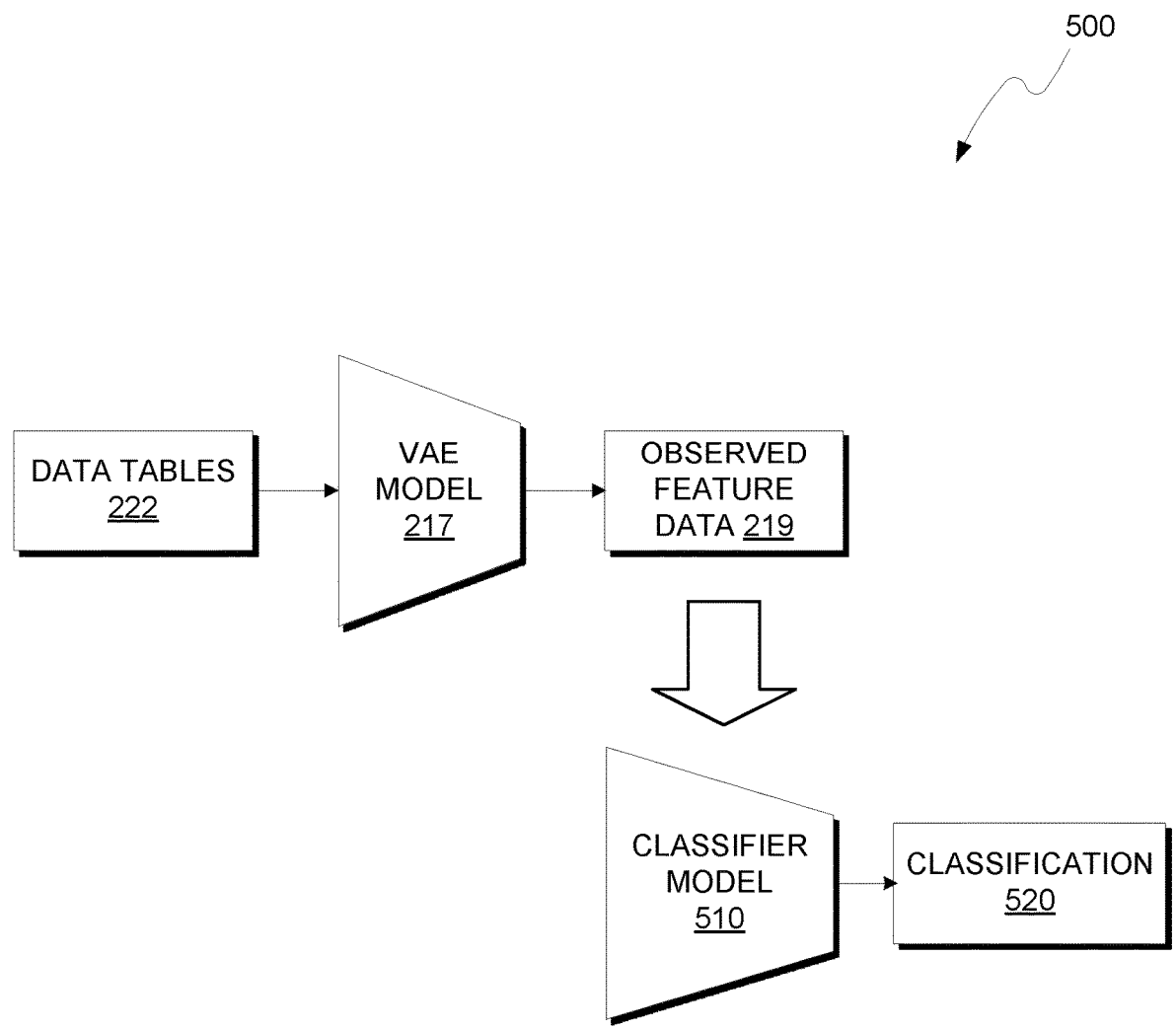
FIG. 5 depicts a block diagram of a learning transfer for downstream machine learning tasks.

FIG. 5 depicts a block diagram of a learning transfer, designated as 500, for downstream machine learning tasks. As discussed herein, VAE model 217 is trained on a variety of publicly available data tables 222. In various embodiments, synthetic table program 211 generates observed feature data 219. Observed feature data 219 includes various features present in input tables provided to VAE model 217 by synthetic table program 211. Typically, the features in observed feature data 219 are ranked based on a confidence of the VAE model 217 that the features are present. In various scenarios, observed feature data 219 is a vector of various latent embeddings for features observed in data tables 222.

In various scenarios, synthetic table program 211 can provide a learning transfer to other machines learning models, such as classifier model 510. In machine learning, classifier models, such as classifier model 510, are configured to classify an input to a certain category. For example, a classification model could be supplied an image as input and classify the images as containing a dog, cat, car, etc. Classification 520 includes any classification or category classifier model 510 categorizes input supplied to the model. One of ordinary skill in the art will appreciate that classifier model 510 could be any machine learning model that supports feature transfer learning without deviating from the invention and that other machine learning models may be imparted with observed feature data 219 for representation learning, such as, but not limited to autoencoders, transformers, and the like.

In various embodiments, synthetic table program 211 sends observed feature data 219 to a machine learning model for feature transfer learning to another machine learning model, such as classifier model 510. Based on the observed feature data 219 extracted by VAE model 217 from public data tables 222, synthetic table program 211 imparts feature learning derived from data tables 222 to classifier model 510, such that classification 520 is improved in accuracy, coherency or any other metric of the classifier model 510 utilizes to derive classification 520.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method for transferable feature engineering and synthetic data generation, the computer-implemented method comprising:
    retrieving a plurality of data tables, wherein the plurality of data tables are heterogeneous in format and content;
    removing at least one timestamp from the plurality of data tables to reduce noise within the plurality of data tables;
    generating a variational auto-encoder (VAE) model;
    training the VAE model on the plurality of data tables after removal of the at least one timestamp;
    receiving an input data table;
    generating a synthetic data table based on the input data table and the trained VAE model;
    determining a subset of the plurality of data tables which have a lower column width than a maximum column width of the plurality of data tables;
    inserting blank columns up to the maximum column width for the subset of the plurality of data tables; and
    inserting a predetermined data value in the blank columns to prevent the VAE model from training the blank columns with the predetermined data.

2. The computer-implemented method of claim 1, the computer-implement method further comprising:
    generating a list of latent features present in the input data based on the input data table and the trained VAE model; and
    determining a column width for each of the plurality of data tables.

3. The computer-implemented method of claim 2, the computer-implement method further comprising:
    normalizing the values of the plurality of data tables based on a Gaussian Mixture Model (GMM); and
    modifying the GMM comprising constraining a number of samples attributed to a mode component.

4. The computer-implemented method of claim 1, the computer-implement method further comprising:
    generating signatures for the columns of the plurality of data tables based on one or more of the following: column name, column data type, column categories and metadata regarding the plurality of data tables, and wherein the VAE model is generated based on the signatures.

5. The computer-implemented method of claim 4, wherein training the VAE model is further based on the signatures for the columns of the plurality of data table, wherein the signatures comprise word embeddings and metadata vectors of quantiles for each of the columns.

6. The computer-implemented method of claim 1, wherein training the VAE model further comprises:
    extracting at least one row from the plurality of data tables via a synthetic table program;
    supplying at least one table of the plurality of data tables to an input layer of the VAE model;
    supplying the at least one row of the plurality of data tables to an output layer of the VAE model based on the extracting; and
    determining an encoding to generate the at least one row based on the at least one table.

7. The computer-implemented method of claim 6, wherein the VAE model is trained without supervision based on the at least one table comprising:
    determining a variance for column values across a plurality of rows within the plurality of data tables;
    determining the variance is above a threshold; and
    removing a column prior to training the VAE model on the plurality of data tables.

8. A computer program product for transferable feature engineering and synthetic data generation, the computer program product comprising:
    one or more computer-readable storage media and program instructions stored on the one or more computer-readable storage media, the program instructions comprising:
    program instructions to retrieve a plurality of data tables, wherein the plurality of data tables are heterogeneous in format and content;
    program instructions to remove at least one timestamp from the plurality of data tables to reduce noise within the plurality of data tables;
    program instructions to generate a variational auto-encoder (VAE) model;
    program instructions to train the VAE model on the plurality of data tables after removal of the at least one timestamp;
    program instructions to receive an input data table;
    program instructions to generate a synthetic data table based on the input data table and the trained VAE model;

program instructions to determine a subset of the plurality of data tables which have a lower column width than a maximum column width of the plurality of data tables;

program instructions to insert blank columns up to the maximum column width for the subset of the plurality of data tables; and program instructions to insert a predetermined data value in the blank columns to prevent the VAE model from training the blank columns with the predetermined data.

9. The computer program product of claim 8, the program instructions further comprising:

program instructions to generate a list of latent features present in the input data based on the input data table and the trained VAE model; and program instructions to determine a column width for each of the plurality of data tables.

10. The computer program product of claim 9, the program instructions further comprising:

program instructions to normalize the values of the plurality of data tables based on a Gaussian Mixture Model (GMM).

11. The computer program product of claim 8, the program instructions further comprising:

program instructions to generate signatures for the columns of the plurality of data tables based on one or more of the following: column name, column data type, column categories and metadata regarding the plurality of data tables.

12. The computer program product of claim 11, wherein program instructions to train the VAE model is further based on the signatures for the columns of the plurality of data table.

13. The computer program product of claim 8, wherein program instructions to train the VAE model further comprises:

program instructions to supply at least one table of the plurality of data tables to an input layer of the VAE model;

program instructions to supply at least one row of the plurality of data tables to an output layer of the VAE model; and program instructions to determine an encoding to generate the at least one row based on the at least one table.

14. The computer program product of claim 13, wherein the VAE model is trained without supervision.

15. A computer system for transferable feature engineering and synthetic data generation, the computer system comprising:

one or more computer processors;

one or more computer readable storage media; and program instructions stored on the computer readable storage media for execution by at least one of the one or more processors, the program instructions comprising:

program instructions to retrieve a plurality of data tables, wherein the plurality of data tables are heterogeneous in format and content;

program instructions to remove at least one timestamp from the plurality of data tables to reduce noise within the plurality of data tables;

program instructions to generate a variational auto-encoder (VAE) model;

program instructions to train the VAE model on the plurality of data tables after removal of the at least one timestamp;

program instructions to receive an input data table;

program instructions to generate a synthetic data table based on the input data table and the trained VAE model;

program instructions to determine a subset of the plurality of data tables which have a lower column width than a maximum column width of the plurality of data tables;

program instructions to insert blank columns up to the maximum column width for the subset of the plurality of data tables; and program instructions to insert a predetermined data value in the blank columns to prevent the VAE model from training the blank columns with the predetermined data.

16. The computer system of claim 15, the program instructions further comprising:

program instructions to generate a list of latent features present in the input data based on the input data table and the trained VAE model; and program instructions to determine a column width for each of the plurality of data tables.

17. The computer system of claim 16, the program instructions further comprising:

program instructions to normalize the values of the plurality of data tables based on a Gaussian Mixture Model (GMM).

18. The computer system of claim 15, the program instructions further comprising:

program instructions to generate signatures for the columns of the plurality of data tables based on one or more of the following: column name, column data type, column categories and metadata regarding the plurality of data tables.

19. The computer system of claim 18, wherein program instructions to train the VAE model is further based on the signatures for the columns of the plurality of data table.

20. The computer system of claim 15, wherein program instructions to train the VAE model further comprises:

program instructions to supply at least one table of the plurality of data tables to an input layer of the VAE model;

program instructions to supply at least one row of the plurality of data tables to an output layer of the VAE model; and program instructions to determine an encoding to generate the at least one row based on the at least one table.

* * * * *